US012587348B2

(12) United States Patent
Liu et al.

(10) Patent No.: US 12,587,348 B2
(45) Date of Patent: Mar. 24, 2026

(54) CONFIGURING AN ACKNOWLEDGEMENT/NEGATIVE ACKNOWLEDGEMENT TRANSMISSION USING A PHYSICAL SIDELINK FEEDBACK CHANNEL IN UNLICENSED SPECTRUM

(71) Applicant: QUALCOMM Incorporated, San Diego, CA (US)

(72) Inventors: Chih-Hao Liu, San Diego, CA (US);
Qing Li, Princeton Junction, NJ (US);
Jing Sun, San Diego, CA (US);
Giovanni Chisci, San Diego, CA (US);
Jae Ho Ryu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 18/486,538

(22) Filed: Oct. 13, 2023

(65) Prior Publication Data

US 2024/0380557 A1 Nov. 14, 2024

Related U.S. Application Data

(60) Provisional application No. 63/501,604, filed on May 11, 2023.

(51) Int. Cl.
*H04L 5/00* (2006.01)
*H04W 72/25* (2023.01)

(52) U.S. Cl.
CPC ............ *H04L 5/0055* (2013.01); *H04W 72/25* (2023.01)

(58) Field of Classification Search
USPC ........ 370/229, 230, 236, 241, 242, 252, 328, 370/329, 330
See application file for complete search history.

(56) References Cited

U.S. PATENT DOCUMENTS

| | | | | |
|---|---|---|---|---|
| 2022/0132471 A1* | 4/2022 | Hwang | ................. | H04L 1/1812 |
| 2023/0354387 A1* | 11/2023 | Niu | ......................... | H04W 72/40 |
| 2025/0184040 A1* | 6/2025 | Chen | ..................... | H04L 1/1854 |
| 2025/0254711 A1* | 8/2025 | Lee | ............................ | H04L 5/00 |
| 2025/0287423 A1* | 9/2025 | Wang | .................... | H04L 5/0044 |

* cited by examiner

*Primary Examiner* — Nguyen H Ngo
(74) *Attorney, Agent, or Firm* — Harrity & Harrity, LLP

(57) ABSTRACT

Various aspects of the present disclosure generally relate to wireless communication. In some aspects, a user equipment (UE) may receive a physical sidelink shared channel (PSCCH) transmission that uses unlicensed spectrum. The UE may select a resource block (RB) configuration for one or more resource blocks (RBs) that are associated with a physical sidelink feedback channel (PSFCH) transmission, the RB configuration being based at least in part on the unlicensed spectrum. The UE may transmit an acknowledgement (ACK)/negative acknowledgement (NACK) response to the PSCCH transmission based at least in part on using the PSFCH and the RB configuration for the one or more RBs. Numerous other aspects are described.

30 Claims, 10 Drawing Sheets

900

910 — Receive a physical sidelink shared channel (PSCCH) transmission that uses unlicensed spectrum 920 — Select a resource block (RB) configuration for one or more resource blocks (RBs) that are associated with a physical sidelink feedback channel (PSFCH) transmission, the RB configuration being based at least in part on the unlicensed spectrum 930 — Transmit an acknowledgement (ACK)/negative acknowledgement (NACK) response to the PSCCH transmission based at least in part on using the PSFCH and the RB configuration for the one or more RBs

400

110

Access Link (AL)

Access Link (AL)

Sidelink (SL)

Rx/Tx UE
410

Tx/Rx UE
405

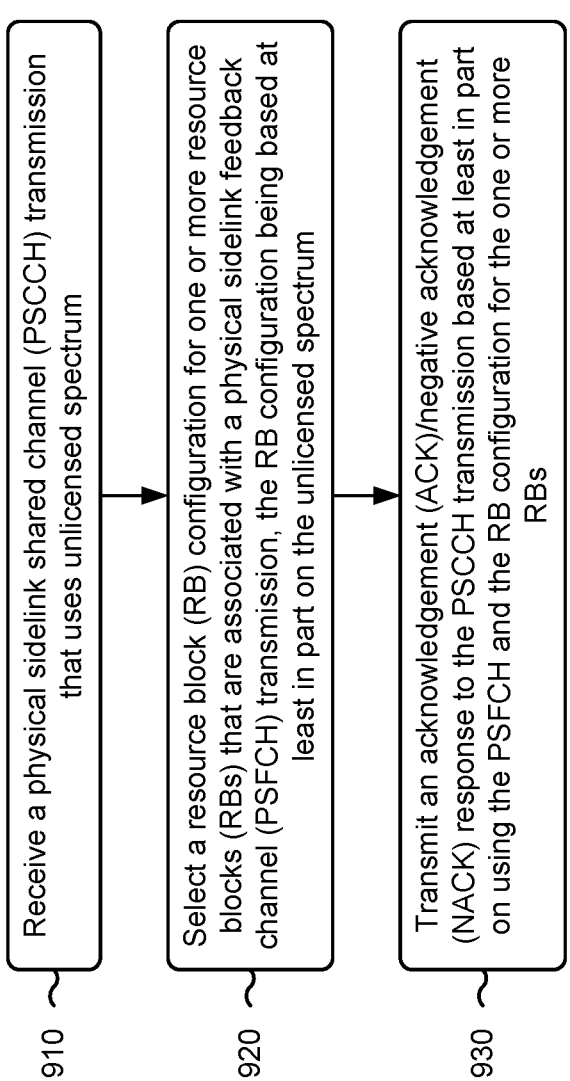

910 — Receive a physical sidelink shared channel (PSCCH) transmission that uses unlicensed spectrum 920 — Select a resource block (RB) configuration for one or more resource blocks (RBs) that are associated with a physical sidelink feedback channel (PSFCH) transmission, the RB configuration being based at least in part on the unlicensed spectrum 930 — Transmit an acknowledgement (ACK)/negative acknowledgement (NACK) response to the PSCCH transmission based at least in part on using the PSFCH and the RB configuration for the one or more RBs

CONFIGURING AN ACKNOWLEDGEMENT/NEGATIVE ACKNOWLEDGEMENT TRANSMISSION USING A PHYSICAL SIDELINK FEEDBACK CHANNEL IN UNLICENSED SPECTRUM

CROSS-REFERENCE TO RELATED APPLICATION

This Patent Application claims priority to U.S. Provisional Patent Application No. 63/501,604, filed on May 11, 2023, entitled "CONFIGURING AN ACKNOWLEDGE-MENT/NEGATIVE ACKNOWLEDGEMENT TRANS-MISSION USING A PHYSICAL SIDELINK FEEDBACK CHANNEL IN UNLICENSED SPECTRUM," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for configuring an acknowledgement/negative acknowledgement transmission using a physical sidelink feedback channel in unlicensed spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a physical sidelink shared channel (PSCCH) transmission that uses unlicensed spectrum. The method may include selecting a resource block (RB) configuration for one or more RBs that are associated with a physical sidelink feedback channel (PSFCH) transmission, the RB configuration being based at least in part on the unlicensed spectrum. The method may include transmitting an acknowledgement (ACK)/negative acknowledgement (NACK) response to the PSCCH transmission based at least in part on using the PSFCH and the RB configuration for the one or more RBs.

Some aspects described herein relate to an apparatus for wireless communication at a UE. The apparatus may include one or more memories and one or more processors coupled to the one or more memories. The one or more processors may be configured to receive a PSCCH transmission that uses unlicensed spectrum. The one or more processors may be configured to select an RB configuration for one or more RBs that are associated with a PSFCH transmission, the RB configuration being based at least in part on the unlicensed spectrum. The one or more processors may be configured to transmit an ACK/NACK response to the PSCCH transmission based at least in part on using the PSFCH and the RB configuration for the one or more RBs.

Some aspects described herein relate to a non-transitory computer-readable medium that stores a set of instructions for wireless communication by a UE. The set of instructions, when executed by one or more processors of the UE, may cause the UE to receive a PSCCH transmission that uses unlicensed spectrum. The set of instructions, when executed by one or more processors of the UE, may cause the UE to select an RB configuration for one or more RBs that are associated with a PSFCH transmission, the RB configuration being based at least in part on the unlicensed spectrum. The set of instructions, when executed by one or more processors of the UE, may cause the UE to transmit an ACK/NACK response to the PSCCH transmission based at least in part on using the PSFCH and the RB configuration for the one or more RBs.

Some aspects described herein relate to an apparatus for wireless communication. The apparatus may include means for receiving a PSCCH transmission that uses unlicensed spectrum. The apparatus may include means for selecting an RB configuration for one or more RBs that are associated with a PSFCH transmission, the RB configuration being based at least in part on the unlicensed spectrum. The apparatus may include means for transmitting an ACK/

NACK response to the PSCCH transmission based at least in part on using the PSFCH and the RB configuration for the one or more RBs.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a UE, in accordance with the present disclosure.

DETAILED DESCRIPTION

Figure 1:
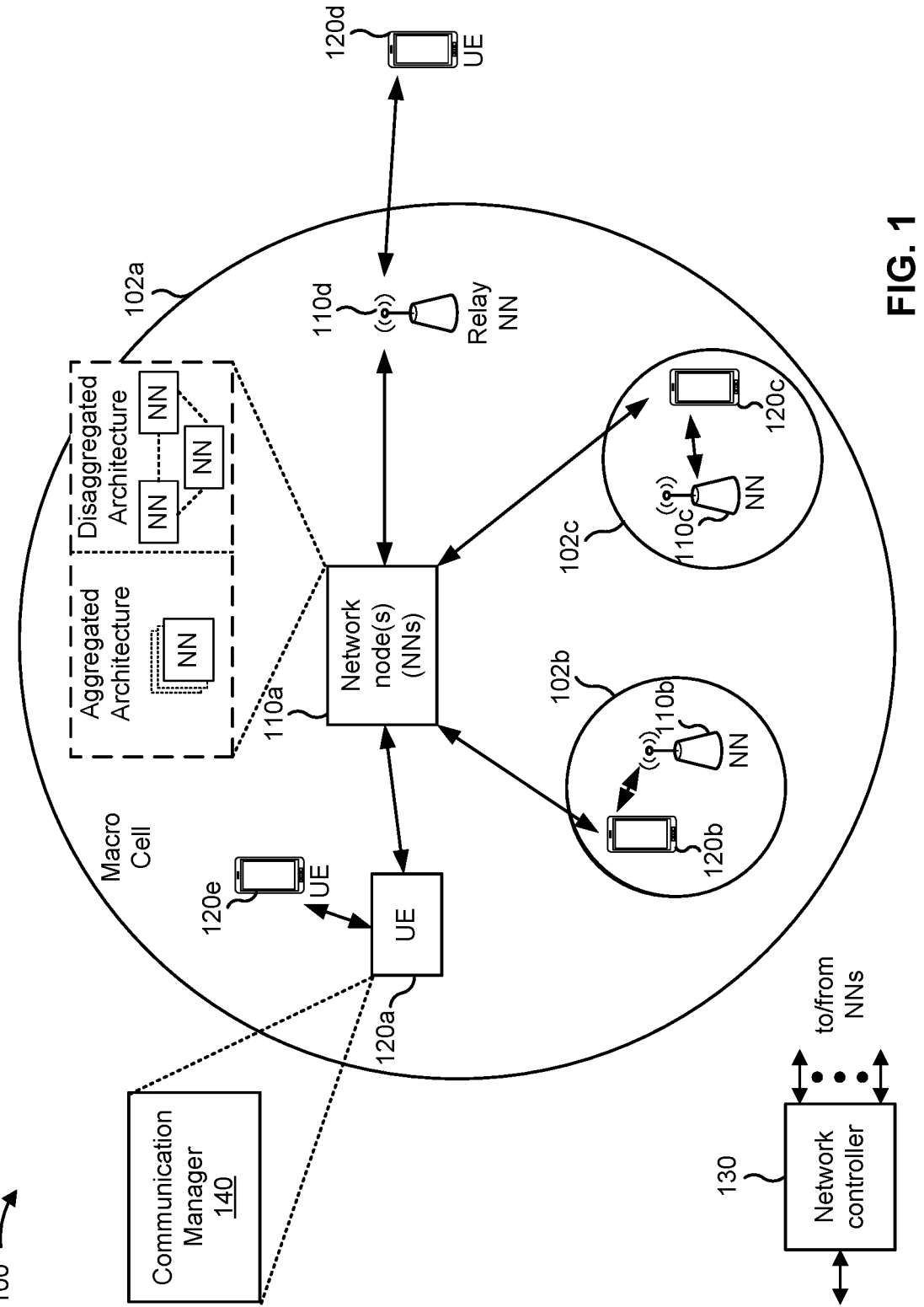
FIG. 1 is a diagram illustrating an example of a wireless network, in accordance with the present disclosure.

Multiplexing physical sidelink feedback channel (PSFCH) acknowledgement (ACK)/negative acknowledgement (NACK) feedback indications with a physical sidelink shared channel (PSSCH) in unlicensed spectrum may consume a capacity of the PSFCH resources for groupcast transmissions. To illustrate, for unicast sidelink transmissions, a user equipment (UE) may select physical resource blocks (PRBs) for respective ACK/NACK feedback indications based at least in part on a PSSCH transmission mapping to a PSFCH resource in a same interlace and/or the mapping of different PSSCH slots within the same interlace to different cyclic shift (CS) pair sets. For groupcast transmissions, multiple receiving UEs may be responding to a same PSCCH transmission. Accordingly, mapping used for unicast transmissions to determine a PSFCH resource for an ACK/NACK feedback indication may result in transmission collisions. Alternatively, or additionally, a size of the groupcast and/or a number of UEs included in the group cast may result in the UEs failing to meet a power spectral density (PSD) condition. Transmission collisions may result in a loss of information in the transmissions, increased air interface resource usage, increased recovery errors, and/or increased data transfer latencies. Alternatively, or additionally, failure to meet a PSD condition may result in increased interference, increased recovery errors, and/or increased data transfer latencies in a wireless network.

Various aspects described herein generally relate to configuring an ACK/NACK transmission using a PSFCH in unlicensed spectrum. Some aspects more specifically relate to a UE determining an RB configuration to mitigate transmission collisions and/or to satisfy a PSD condition. In some examples, a UE may receive a PSCCH transmission that uses unlicensed spectrum. The UE may select an RB configuration for one or more RBs that are associated with a PSFCH transmission. To illustrate, the UE may select the RB configuration based at least in part on a mapping and/or a selection rule, and the RB configuration may be associated with one or more RBs in unlicensed spectrum. Using the RB configuration, the UE may transmit and ACK/NACK response to the PSCCH transmission based at least in part on the PSFCH and the unlicensed spectrum.

Particular aspects of the subject matter described in this disclosure can be implemented to realize one or more of the following potential advantages. A UE selecting an RB configuration for a PSFCH transmission based at least in part on one or more selection rules may enable the UE to mitigate collisions between multiple UEs that may respond to a same PSCCH transmission. Alternatively, or additionally, the selection rule(s) may enable a UE, or multiple UEs, to satisfy a PSD condition and/or increase a transmission power of the PSFCH transmission. Mitigating collisions, satisfying a PSD condition, and/or increasing a transmission power may result in reduced air interface resource usage by the UE, reduced recovery errors, and/or reduced data transfer latencies in a wireless network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may receive a PSCCH transmission that uses unlicensed spectrum; select an RB configuration for one or more RBs that are associated with a PSFCH transmission, the RB configuration being based at least in part on the unlicensed spectrum; and transmit an ACK/NACK response to the PSCCH transmission based at least in part on using the PSFCH and the RB configuration for the one or more RBs. Additionally, or alternatively, the communication manager 140 may perform one or more other operations described herein.

As indicated above, FIG. 1 is provided as an example. Other examples may differ from what is described with regard to FIG. 1.

Figure 2:
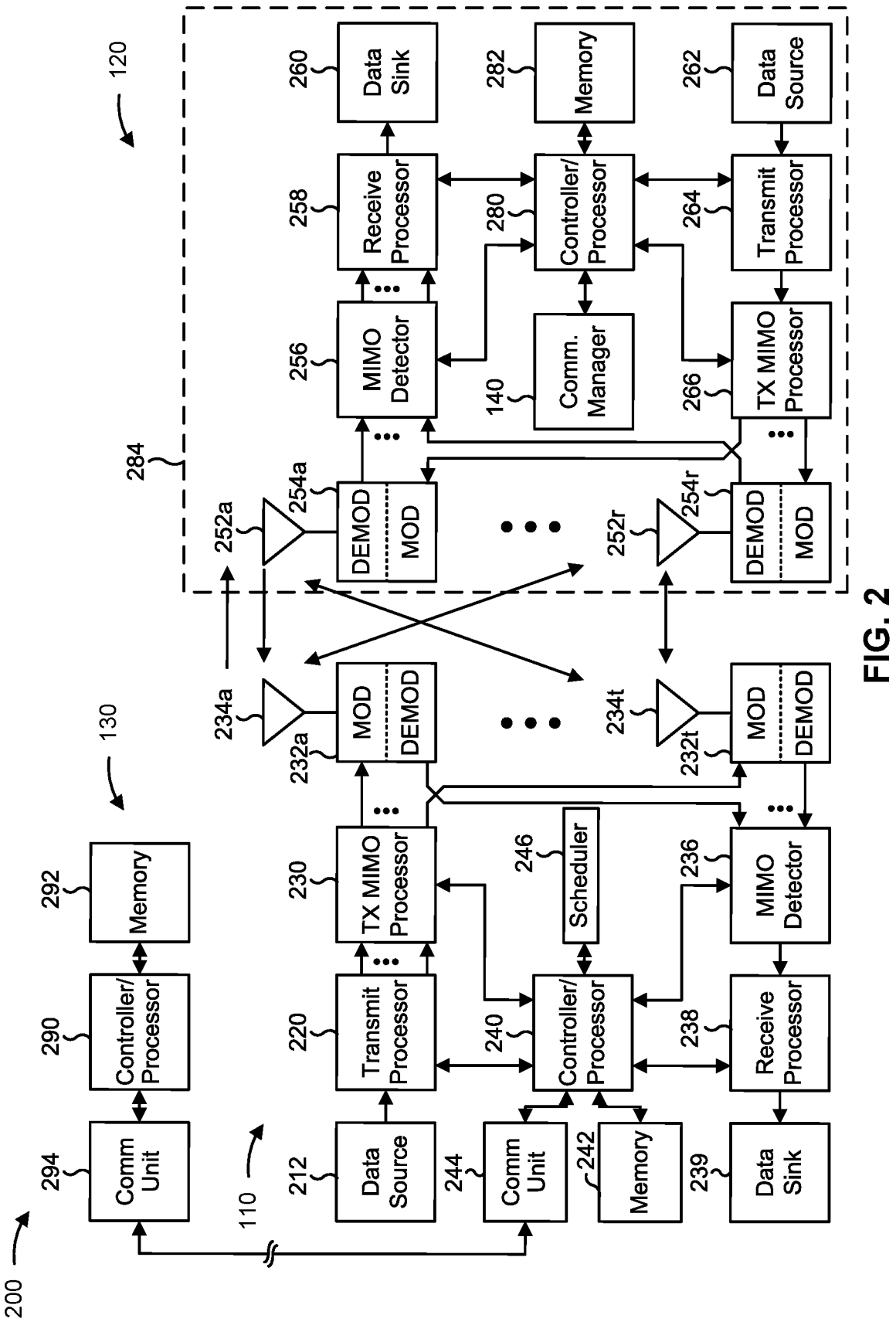
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-10).

The controller/processor 240 of the network node 110, the controller/processor 280 of the UE 120, and/or any other component(s) of FIG. 2 may perform one or more techniques associated with configuring an ACK/NACK transmission using a PSFCH in unlicensed spectrum, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, a UE (e.g., a UE 120) includes means for receiving a PSCCH transmission that uses unlicensed spectrum; means for selecting an RB configuration for one or more RBs that are associated with a PSFCH transmission, the RB configuration being based at least in part on the unlicensed spectrum; and/or means for transmitting an ACK/NACK response to the PSCCH transmission based at least in part on using the PSFCH and the RB configuration for the one or more RBs. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
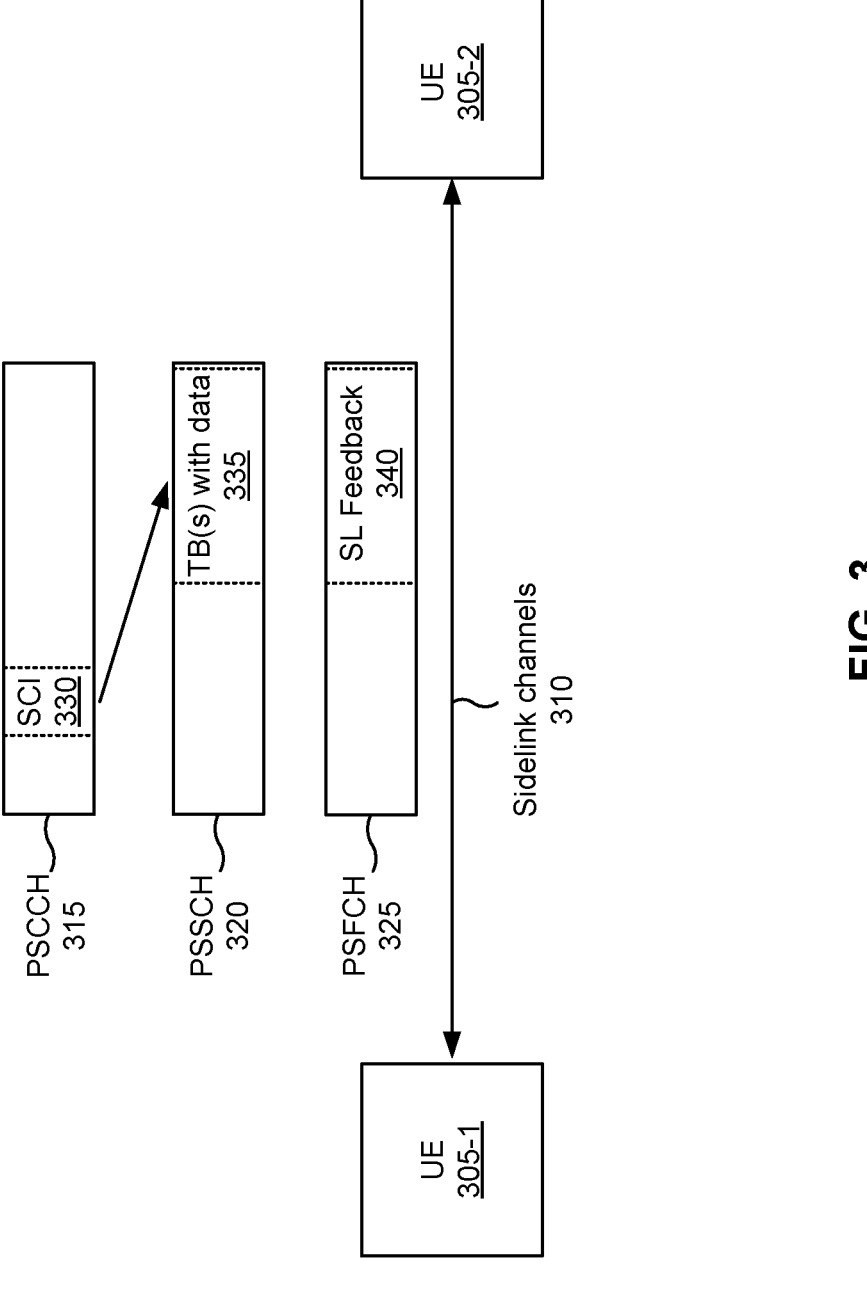
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a PSSCH 320, and/or a PSFCH 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., ACK/NACK information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific RBs across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a transmission mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
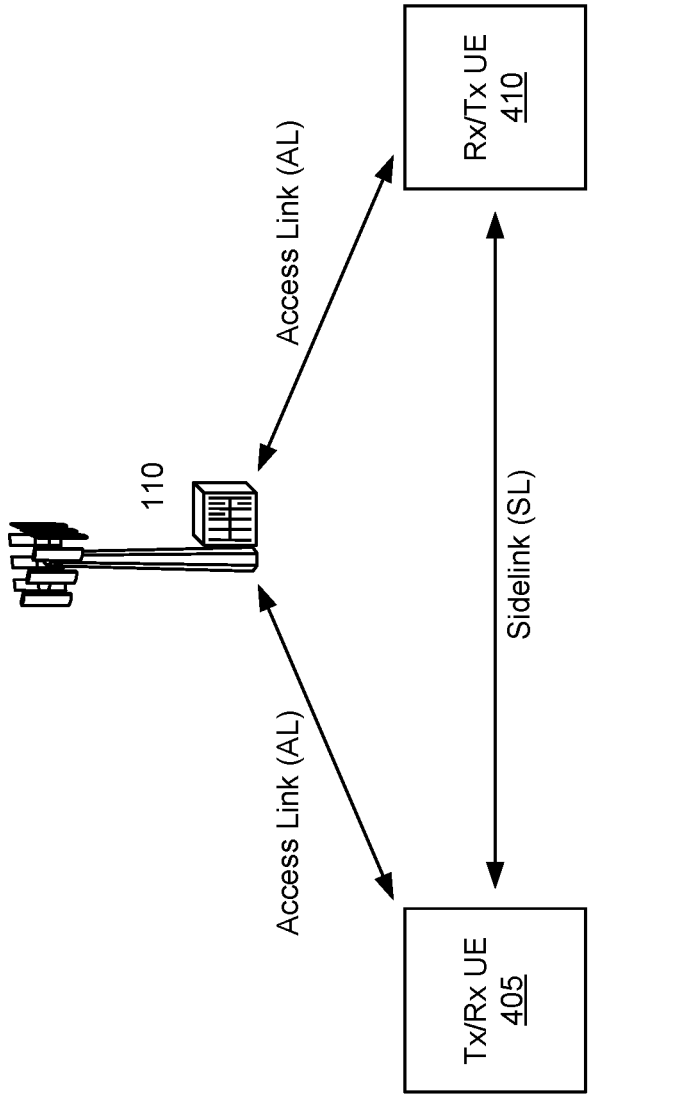
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 110 may communicate with the Tx/Rx UE 405 (e.g., directly or via one or more network nodes), such as via a first access link. Additionally, or alternatively, in some sidelink modes, the network node 110 may communicate with the Rx/Tx UE 410 (e.g., directly or via one or more network nodes), such as via a first access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 4 is provided as an example. Other examples may differ from what is described with respect to FIG. 4.

Figure 5:
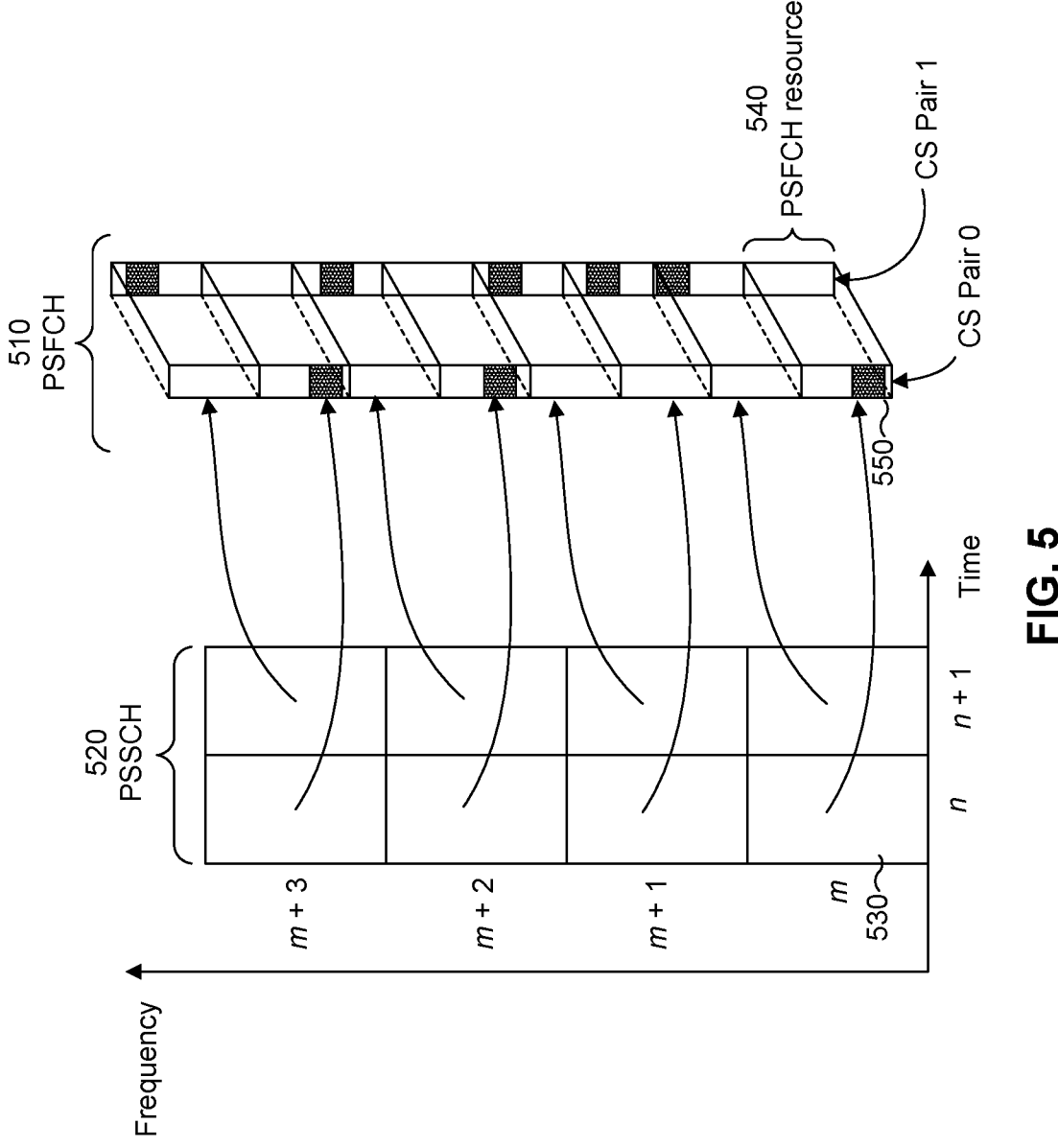
FIG. 5 is a diagram illustrating an example of resources associated with a PSFCH, in accordance with the present disclosure.

FIG. 5 is a diagram illustrating an example 500 of resources associated with a PSFCH 510, in accordance with the present disclosure. As described herein, the resources shown in example 500 may be associated with sidelink communications, such as the sidelink communications described in connection with FIG. 3 and FIG. 4. For example, the resources shown in example 500 and described herein may be associated with sidelink communications between and/or among multiple UEs (e.g., UE 120, UE 305-1, UE 305-2, among other examples). Additionally, or alternatively, the PSFCH 510 shown in FIG. 5 and described herein may correspond to the PSFCH 325 described in connection with FIG. 3.

In some aspects, the PSFCH 510 may be associated with (e.g., be used to carry or otherwise provide HARQ feedback related to) a PSSCH 520, which may correspond to the PSSCH 320 described in connection with FIG. 3. For example, in some aspects, the HARQ feedback may include an ACK to indicate that a responding UE successfully received and decoded a PSSCH message transmitted on the PSSCH 520 or a NACK to indicate that the responding UE failed to receive or failed to decode a PSSCH message transmitted on the PSSCH 520. In some aspects, the PSSCH 520 may be associated with a set of PSSCH occasion 530, which may be present across a resource grid associated with slots n and n+1 and subchannels m, m+1, m+2, and m+3. Each PSSCH occasion 530 may correspond to a different PSFCH resource 540 associated with the PSFCH 510. For example, for a PSSCH communication received in slot n and subchannel m, a responding UE may transmit HARQ feedback information 550 over multiple PRBs within a corresponding PSFCH resource 540, as shown by the arrow connecting the PSSCH occasion 530 associated with slot n and subchannel m with the PSFCH resource 540 including the HARQ feedback information 550. Similarly, the other PSSCH occasions 530 may each be associated with a corresponding PSFCH resource 540. In some cases, for each PSFCH resource 540, a responding UE may use multiple length-12 sequence repetitions across multiple PRBs and/or may use different CS pairs (e.g., CS pair 0 and CS pair 1) to differentiate between an ACK or a NACK for each sequence.

In some instances, resources associated with the PSFCH 510 may be associated with a resource pool, which is not a dedicated PSFCH resource pool in example 500. Instead, in example 500, the resource pool associated with the PSFCH 510 includes resources for multiple sidelink communication types (e.g., different sidelink channels), such as PSSCH communications and/or PSCCH communications in addition to PSFCH communications. In such cases, the responding UE providing the HARQ feedback information 550 may be configured with one or more parameters to determine the PSFCH 510 and/or a specific PSFCH resource 540 to use to transmit the HARQ feedback information 550. For example, the responding UE may receive an indication of a PSFCH period parameter (e.g., a periodPSFCHresource parameter), which may indicate a period (in a number of slots) within a resource pool for a PSFCH transmission. In some cases, the PSFCH period parameter may have a value equal to zero (0), which may indicate that there is no PSFCH, or the PSFCH period parameter may have a value of one slot, two slots, or four slots. For a given PSSCH 520, the responding UE may then transmit the HARQ feedback information 550 (e.g., ACK/NACK information) in a first slot associated with a PSFCH resource 540 after the PSSCH 520 and following a minimum time gap, which may be indicated by a PSFCH minimum time gap parameter (e.g., a minTimeGapPSFCH parameter).

Additionally, or alternatively, a responding UE may receive an indication of a set of PRBs within a slot that are used for PSFCH transmission and reception (e.g., denoted $$M_{PRB,set}^{PSFCH}$$

and/or indicated in an sl-PSFCH-RB-Set parameter). Accordingly, each PSSCH occasion 530 may be associated with a number of PRBs, which may be a subset of $$M_{PRB,set}^{PSFCH}.$$

More particularly, a PSSCH 520 may be associated with a number of slots associated with one PSFCH 510 slot (e.g., denoted $$N_{PSSCH}^{PSFCH},$$

which, in example 600, is equal to two (2) corresponding to slot n and slot n+1), and/or a PSSCH 520 may be associated with a number of subchannels within each slot (e.g., denoted $$N_{subch}^{PSSCH},$$

which, in example 600, is equal to four (4) corresponding to subchannels m, m+1, m+2, and m+3). In such cases, each subchannel and/or slot of the PSSCH 520 resource grid (e.g., each PSSCH occasion 530) may be associated with a number of PSFCH PRBs (e.g., denoted $$M_{subch,slot}^{PSFCH})$$

for PSFCH transmission and reception, which may be equal to $$\frac{M_{PRB,set}^{PSFCH}}{N_{PSSCH}^{PSFCH} \times N_{subch}}$$

PRBs. Moreover, a mapping between each subchannel and/or slot of the PSSCH 520 resource grid (e.g., each PSSCH occasion 530) and a corresponding PSFCH resource 540 may be performed in a time-first manner, as shown using arrows in FIG. 5. More particularly, a first-in-time PSSCH occasion 530 (e.g., a PSSCH occasion 530 in slot n) in a first subchannel (e.g., subchannel m) may be mapped to a first PSFCH resource 540, a second-in-time PSSCH occasion 530 in a first subchannel may be mapped to a second PSFCH resource 540, a first-in-time PSSCH occasion 530 in a second subchannel may be mapped to a third PSFCH resource 540, and so forth.

In some cases, a size of a PSFCH resource pool (e.g., denoted $$R_{PRB,CS}^{PSFCH}),$$

may be equal to $$N_{type}^{PSFCH} \times N_{CS}^{PSFCH} \times M_{subch,slot}^{PSFCH}.$$

In such cases, $$N_{type}^{PSFCH}$$

may be based at least in part on whether the PSFCH resource pool is associated with multiple subchannels in a PSSCH slot. For example, $$N_{type}^{PSFCH}$$

may be equal to one (1) if the PSFCH resource pool is only associated with one PSSCH subchannel, or may otherwise equal the number of subchannels within each PSSCH slot (e.g., $$N_{subch}^{PSSCH}).$$

Furthermore, the term $$N_{CS}^{PSFCH}$$

may correspond to a number of cyclic shift pairs associated with the PSFCH resource pool, which may be configured per resource pool, and the term $$M_{subch,slot}^{PSFCH}$$

may correspond to the number of PSFCH PRBs associated with each subchannel and/or slot of the PSSCH 520 resource grid (e.g., each PSSCH occasion 530), as described above. Additionally, or alternatively, a responding UE may determine a PSFCH resource according to the formula $$(P_{ID} + M_{ID}) \bmod R_{PRB,CS}^{PSFCH},$$

where $$R_{PRB,CS}^{PSFCH}$$

corresponds to the size of the PSFCH resource pool (as described above), $P_{ID}$ corresponds to a physical source identifier indicated by an SCI message (e.g., SCI-2A or SCI-2B) associated with the PSSCH 520, and $M_{ID}$ is either zero (0) or corresponds to an identity of the responding UE receiving the PSSCH 520. In other words, for a unicast transmission, $M_{ID}$ may be equal to zero (0) and the responding UE will provide feedback in a PSFCH resource pool that depends only on a source identifier (e.g., $P_{ID}$), and for a groupcast transmission, each receiving UE may pick a separate resource in the resource pool for transmitting feedback, which is dependent on both $P_{ID}$ and $M_{ID}$.

When a UE is communicating with a network node over an access link or Uu interface (e.g., as shown in FIG. 4), one or more PDSCH messages may be scheduled for transmission from the network node to the UE (e.g., based on a dynamic grant or an SPS configuration). In such cases, the UE may generate HARQ feedback that includes an ACK to indicate that the UE received and successfully decoded a scheduled PDSCH message or a NACK to indicate that the scheduled PDSCH message was not received (e.g., did not arrive at the UE) or that the UE was unable to successfully decode the scheduled PDSCH message. Accordingly, the UE may transmit a PUCCH message that carries the HARQ feedback to the network node to either inform the network node that the scheduled PDSCH message was correctly received and decoded or request that the network node retransmit the PDSCH message. In some cases, the UE can multiplex the PUCCH with a PUSCH message that carries an uplink transport block (e.g., sometimes referred to as "piggybacking" the PUCCH onto the PUSCH message), where the PUCCH is transmitted in one or more PRBs that are otherwise allocated to the PUSCH message. In such cases, multiplexing the PUCCH with (or piggybacking the PUCCH onto) the PUSCH message can significantly improve transmission efficiency associated with the HARQ feedback (e.g., because separate time and/or frequency resources do not need to be allocated to the PUCCH).

In general, applying similar multiplexing or piggybacking techniques to sidelink communications may improve efficiency when a responding UE that is providing HARQ feedback to a transmitting UE also has sidelink data to transmit in a PSSCH message. For example, when the transmitting UE and the responding UE are engaged in sidelink communication over unlicensed spectrum, the responding UE can multiplex the HARQ feedback with a PSSCH message that carries sidelink data within the same channel occupancy time. In this case, the responding UE may avoid a need to perform a separate listen-before-talk (LBT) procedure for a transmission of the PSSCH message and a transmission of a PSFCH that carries the HARQ feedback. As a result, an LBT failure probability may be reduced, which may improve latency and reliability for sidelink communications over unlicensed spectrum. Furthermore, combining the HARQ feedback and the PSSCH message into a single transmission may generally improve efficiency by avoiding a need to allocate PSFCH resources from a PSFCH resource pool. Accordingly, some aspects described herein relate to various techniques to multiplex a PSFCH with (or piggyback a PSFCH onto) a PSSCH.

As indicated above, FIG. 5 is provided as an example. Other examples may differ from what is described with respect to FIG. 5.

Figure 6:
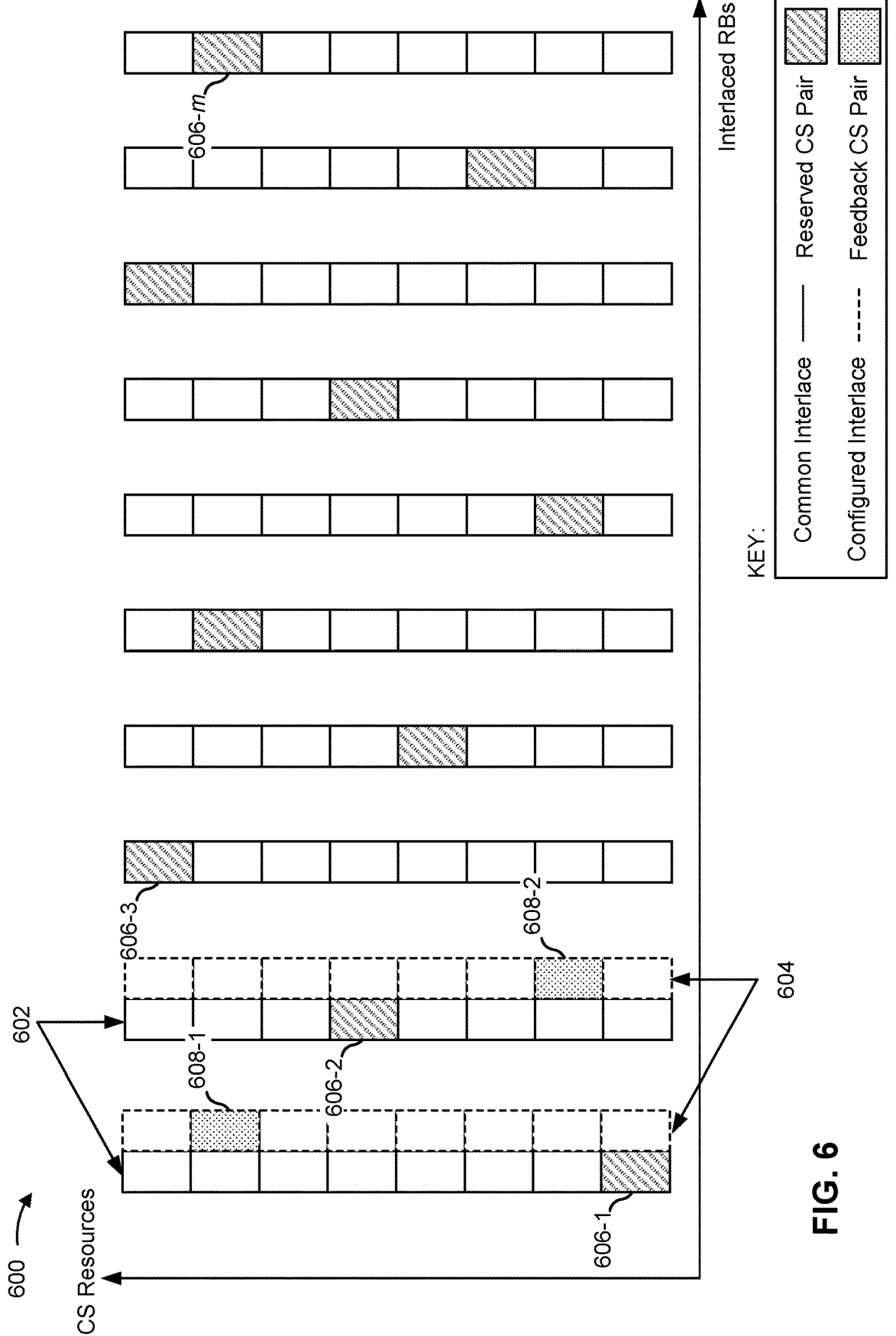
FIG. 6 is a diagram illustrating an example of an interlacing configuration that is associated with a physical sidelink feedback channel (PSFCH) waveform, in accordance with the present disclosure.

FIG. 6 is a diagram illustrating an example 600 of an interlacing configuration that is associated with a PSFCH waveform, in accordance with the present disclosure. In some aspects, the PSFCH waveform may be associated with the PSFCH 325 described in connection with FIG. 3 and/or the PSFCH 510 described in connection with FIG. 5.

In some aspects, access to unlicensed spectrum may be based at least in part on an interlace. An interlace may refer to a basic unit of air interface resource allocation, such as an air interface resource allocation that is characterized based at least in part on any combination of a frequency span (e.g., that may be partitioned into sub-bands and/or sub-carriers), a time span (e.g., that may be partitioned into sub-time spans, such as time slots and/or symbols), and/or one or more PRBs. Access to an interlace may be based at least in part on an interlacing configuration, such as the interlacing configuration associated with the PSFCH waveform that is described with regard to the example 600. A horizontal axis of the interlacing configuration represents interlaced RBs, and a vertical axis of the interlacing configuration represents CS pair resources.

In some aspects, an interlace may include N interlaced resource blocks (IRBs), where N is an integer. As one example, as shown by reference number 602, a first set of IRBs (e.g., N IRBs) may be included in a common interlace (shown with a solid line), and, as shown by reference number 604, a second set of IRBs (e.g., N IRBs or a different number of IRBs) may be included in a configured interlace (shown with a dashed line). In some aspects, the N IRBs of the configured interlace may be partitioned into partial interlaces as described below. The common interlace may be interlaced with the configured interlace based at least in part on one or more IRBs of the common interlace being adjacent to one or more IRBs of the configured interlace. The example 600 illustrates the common interlace as having 10 partitions and the configured interlace as having two partitions, but other examples may include a configured interlace that has a same number of partitions as the common interlace and/or more partitions than, the common interlace. In at least one example, the common interlace and the configured interlace include an equal number of partitions. Alternatively, or additionally, the common interlace and the configured interlace may include an equal number of IRBs and/or different numbers of IRBs from one another.

In some aspects, resources of the common interlace may be accessible to any device (e.g., any UE 120), and resources of the configured interlace may be assigned and/or directed to one or more specific UEs. That is, any UE may transmit the PSFCH based at least in part on the entirety of the resources of the common interlace and/or one or more resources of the configured interlace. Accordingly, any UE may use the one or more PRBs and/or IRBs included in the common interlace shown by reference number 602, and/or a specific UE may use the one or more PRBs and/or IRBs included in the configured interlace shown by reference number 604. For example, a UE may use the resources in the common interlace and/or the configured interlace to transmit any combination of an ACK/NACK feedback indication and/or a dummy signal to satisfy a PSD condition as described below. "Dummy signal" may denote a signal that does not have an intended recipient. In some aspects, a dummy signal may be based at least in part on a pattern and/or a replication of information that is not intended for recovery. That is, the dummy signal may be a signal that is intended to occupy a particular portion of spectrum (e.g., at a particular transmission power level) without intentionally conveying information.

In some aspects, the PSFCH waveform in the example 600 may be based at least in part on a first number of contiguous PRBs for respective ACK/NACK feedback indications on the configured interlace shown by reference number 604 and/or a second number of PSFCH IRBs that are assigned for a dummy signal on the common interlace (e.g., the common interlace shown by reference number 602). The first number of contiguous PRBs for respective ACK/NACK feedback indications may be an integer that is labeled as K3 and, in some aspects, may be a configurable integer. To illustrate, the K3 value and/or pattern used by a UE 120 to transmit the ACK/NACK feedback indication(s) may be RRC configured. Alternatively, or additionally, the second number of PSFCH IRBs may be computed as N−K3, where N is a number of IRBs in one interlace as described above. In at least one example, the PSFCH waveform may be a full interlaced PSFCH waveform based at least in part on K3 being equal to N.

As shown by FIG. 6, a UE 120 may transmit the PSFCH waveform that includes one or more dummy signals (shown as dummy signal 606-1, dummy signal 606-2, dummy signal 606-3, and dummy signal 606-$m$ with diagonal lines, where $m$ is an integer) in one or more IRBs of the common interlace shown by reference number 602, and K3 ACK/

NACK feedback indications (shown as ACK/NACK feedback indication 608-1 and ACK/NACK feedback indication 608-2 with a dotted pattern) in one or more IRBs of the configured interlace shown by reference number 604. In some aspects, the PSFCH waveform may be configured with more than one IRB that is assigned to an ACK/NACK feedback indication to mitigate low transmission power that is based at least in part on a PSD condition (e.g., satisfying a decibel milliwatts per megahertz (dBm/MHz) threshold). Alternatively, or additionally, and based at least in part on reducing a peak to average power ratio (PAPR) for the sidelink transmission, the UE may identify a cyclic shift ramping configuration (e.g., cyclic shift ramping across an interlace) for transmissions that are based at least in part on the common interlace shown by reference number 602 and/or transmissions that are based at least in part on the configured interlace shown by reference number 604.

A UE (e.g., a UE 120) transmitting at least part of the PSFCH waveform may select and/or configure a first transmission power for a dummy signal and/or a second transmission power for an ACK/NACK feedback indication based at least in part on the dummy signal and the ACK/NACK feedback indication being located within a threshold of one another in frequency (e.g., RBs). To illustrate, based at least in part on the ACK/NACK feedback indication and the dummy signal being within a frequency threshold of one another, the UE may adjust a first transmission power for the dummy signal and/or a second transmission power of the ACK/NACK feedback indication to satisfy a dBm/MHz threshold associated with a PSD condition. For example, the UE may reduce the first transmission power level of the dummy signal, drop transmission of the dummy signal, and/or may reduce the second transmission power level of the ACK/NACK feedback indication.

As indicated above, FIG. 6 is provided as an example. Other examples may differ from what is described with regard to FIG. 6.

Figure 7:
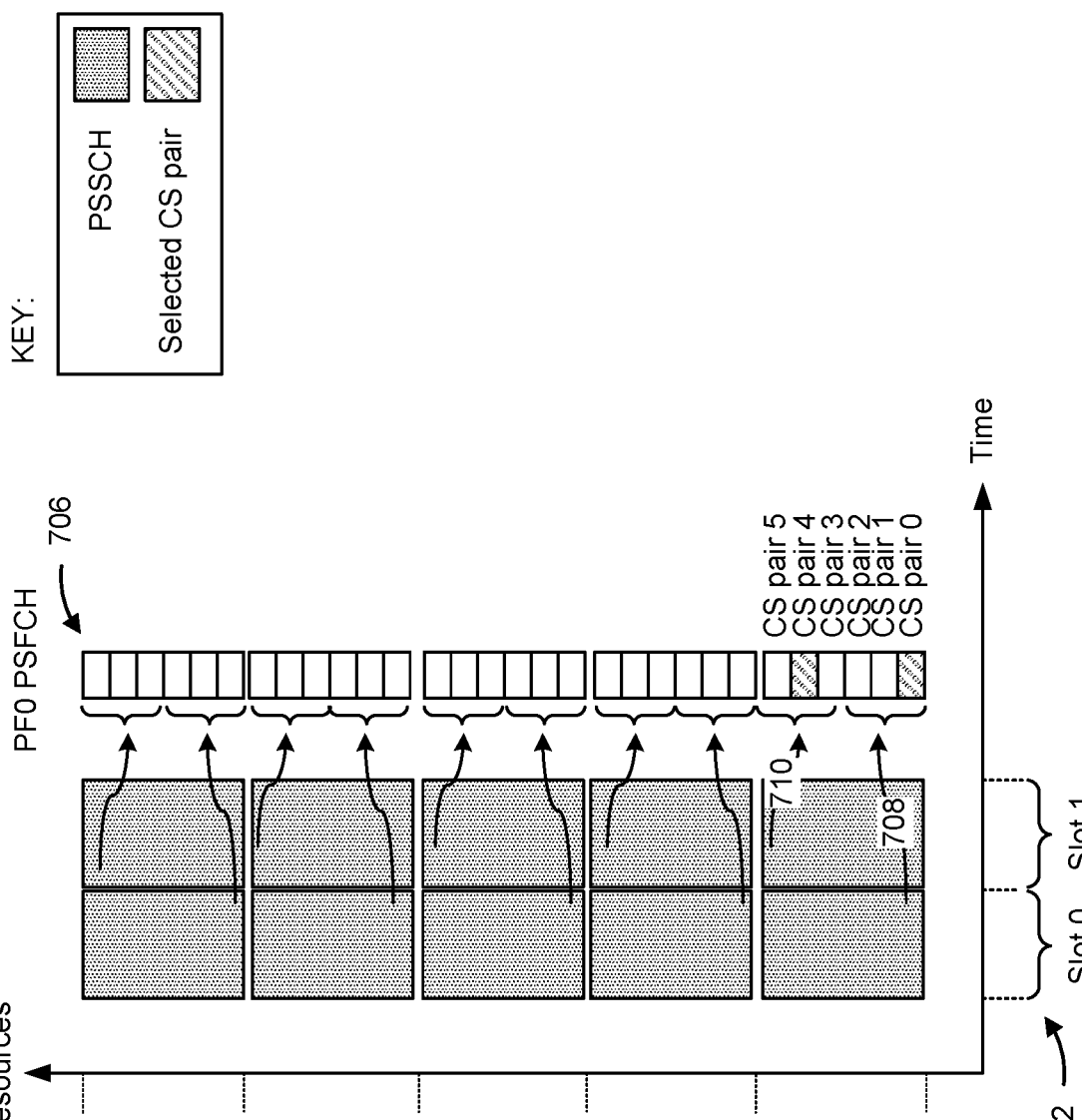
FIG. 7 is a diagram illustrating an example of PSFCH resource mapping, in accordance with the present disclosure.

FIG. 7 is a diagram illustrating an example 700 of PSFCH resource mapping, in accordance with the present disclosure.

The example 700 includes multiple interlaces that are associated with one or more PSSCH transmissions. A horizontal axis of the example 700 represents time, and a vertical axis of the example 700 represents one or more resources that are used to characterize an interlace (e.g., a frequency span and/or a code domain multiplexing (CDM) resource). To illustrate, and as shown by reference number 702, an interlace may be based at least in part on a first time slot (shown as Slot 0) and/or a second time slot (shown as Slot 1). Alternatively, or additionally, and as shown by reference number 704, each interlace may be based at least in part on a respective set of resources (e.g., frequency resources). For instance, Interlace #0 may span a first set of resources during the first time slot and the second time slot, Interlace #1 may span a second set of resources during the first time slot and the second time slot, Interlace #2 may span a third set of resources during the first time slot and the second time slot, and/or Interlace #4 may span a fourth set of resources during the first time slot and the second time slot. In some aspects, the Interlace #0, Interlace #1, Interlace #2, Interlace #3, and/or Interlace #4 may be subchannels of an interlace. As shown by FIG. 7, each time slot of each interlace may be associated with and/or assigned to one or more PSSCH transmissions and/or one or more PSSCH occasions.

In some aspects, PSFCH may be multiplexed with PSSCH, and a PSFCH resource (e.g., a PRB, an RB, and/or an IRB) may be determined based at least in part on a mapping from the PSSCH to the PSFCH resource. To illustrate, PSFCH format 0 (PF0) may refer to a starting point and/or a starting resource for a PSFCH, and a UE (e.g., UE 120) may determine a PSFCH resource to use for a PSFCH transmission based at least in part on the PF0. In some aspects, the UE may determine the PF0 and/or the PSFCH resource based at least in part on one or more RBs assigned to a PSSCH. For instance, the UE may recover a one-to-one mapping from a PSSCH leading interlace and/or slot index to a PSFCH interlace (shown by reference number 706) and/or a CS pair set. As one example, a first mapping as shown by reference number 708 may map a first PSSCH resource (e.g., used to receive the PSSCH) that is located within Slot 0 of Interlace #0 to one or more resources within the PF0 PSFCH resources and/or a first CS pair set that is shown in FIG. 7 as including CS pair 0, CS pair 1, and CS pair 2. A second mapping as shown by reference number 710 may map a PSSCH resource within Slot 1 of Interlace #0 to one or more resources within the PF0 PSFCH resources and/or a second CS pair set that is shown in FIG. 7 as including CS pair 3, CS pair 4, and CS pair 5. Accordingly, a leading PSSCH interlace #x (e.g., PSSCH Interlace #0, Slot 0) may be mapped to a leading PSFCH interlace #x (e.g., PF0 PSFCH).

Selection of a CS pair within a CS pair set may be based at least in part on a hash function. That is, a UE may select a CS pair from the CS pair set for a PSFCH transmission (e.g., an ACK/NACK feedback transmission) based at least in part on a hash function, such as a hash function that is based at least in part on the formula $$(P_{ID} + M_{ID}) \bmod N_{CS-set}^{PSFCH}, \text{ where } N_{CS-set}^{PSFCH},$$

corresponds to the size of the CS pair set, $P_{ID}$ corresponds to a physical source identifier indicated by an SCI message (e.g., SCI-2A or SCI-2B) associated with the PSSCH 520, and $M_{ID}$ is either zero (0) or corresponds to an identity of a responding UE.

Multiplexing PSFCH ACK/NACK feedback indications with PSSCH may consume a capacity of the PSFCH resources for groupcast transmissions. To illustrate, for unicast sidelink transmissions, the selection of the number contiguous PRBs for respective ACK/NACK feedback indications (e.g., K3) may be based at least in part on a PSSCH transmission mapping to a PSFCH resource in a same interlace and/or the mapping of different PSSCH slots within the same interlace to different CS pair sets as described with regard to the example 700. In some aspects, a unicast transmission of an ACK/NACK feedback indication and/or an ACK/NACK response may use a PSFCH resource that spans one interlace. For instance, with regard to the example 500 as described with regard to FIG. 5, K3 may be equal to 10 such that the ACK/NACK indication in combination with the dummy signals span an entirety of the interlace. By using an entirety of available PSFCH resources in one interlace, a PSFCH transmission by the UE may satisfy a PSD condition and mitigate potential recovery errors that are associated with low power transmissions.

For groupcast transmissions, multiple receiving UEs may be responding to a same PSCCH transmission. Accordingly, mapping used for unicast transmissions to determine a PSFCH resource for an ACK/NACK feedback indication may result in transmission collisions. To illustrate, the multiple UEs may use a same PSFCH resource for a respective ACK/NACK feedback indication that results in the transmission collisions. Alternatively, or additionally, a size of the groupcast and/or a number of UEs included in the group cast may result in the UEs failing to meet a PSD condition. For instance, for large groupcasts (e.g., a number of UEs that satisfy a size threshold), the collective transmissions within an interlace may fail to satisfy the PSD condition (e.g., by exceeding the dBm/MHz threshold). Transmission collisions may result in a loss of information in the transmissions, increased air interface resource usage, increased recovery errors, and/or increased data transfer latencies. Alternatively, or additionally, failure to meet a PSD condition may result in increased interference, increased recovery errors, and/or increased data transfer latencies in a wireless network.

Some techniques and apparatuses described herein provide configuring an ACK/NACK transmission (e.g., an ACK/NACK feedback indication) using a PSFCH in unlicensed spectrum. In some aspects, a UE may receive a PSCCH transmission that uses unlicensed spectrum. Based at least in part on receiving the PSCCH transmission, the UE may select an RB configuration for one or more RBs that are associated with a PSFCH transmission. In some aspects, the UE may select the RB configuration based at least in part on using unlicensed spectrum for the PSFCH transmission. The UE may transmit an ACK/NACK response (e.g., an ACK/NACK feedback indication) to the PSCCH transmission based at least in part on using the PSFCH and the RB configuration for the one or more RBs.

As described below, the UE may select an RB configuration for a PSFCH transmission based at least in part on one or more selection rules that mitigate collisions between multiple UEs that may respond to a same PSCCH transmission (e.g., for a groupcast and/or multicast PSCCH transmission). Alternatively, or additionally, the selection rule(s) may enable a UE, or multiple UEs, to satisfy a PSD condition and/or mitigate recovery errors associated with a low power transmission. Mitigating collisions, satisfying a PSD condition, and/or increasing a transmission power may result in reduced air interface resource usage by the UE, reduced recovery errors, and/or reduced data transfer latencies in a wireless network.

As indicated above, FIG. 7 is provided as an example. Other examples may differ from what is described with regard to FIG. 7.

Figure 8:
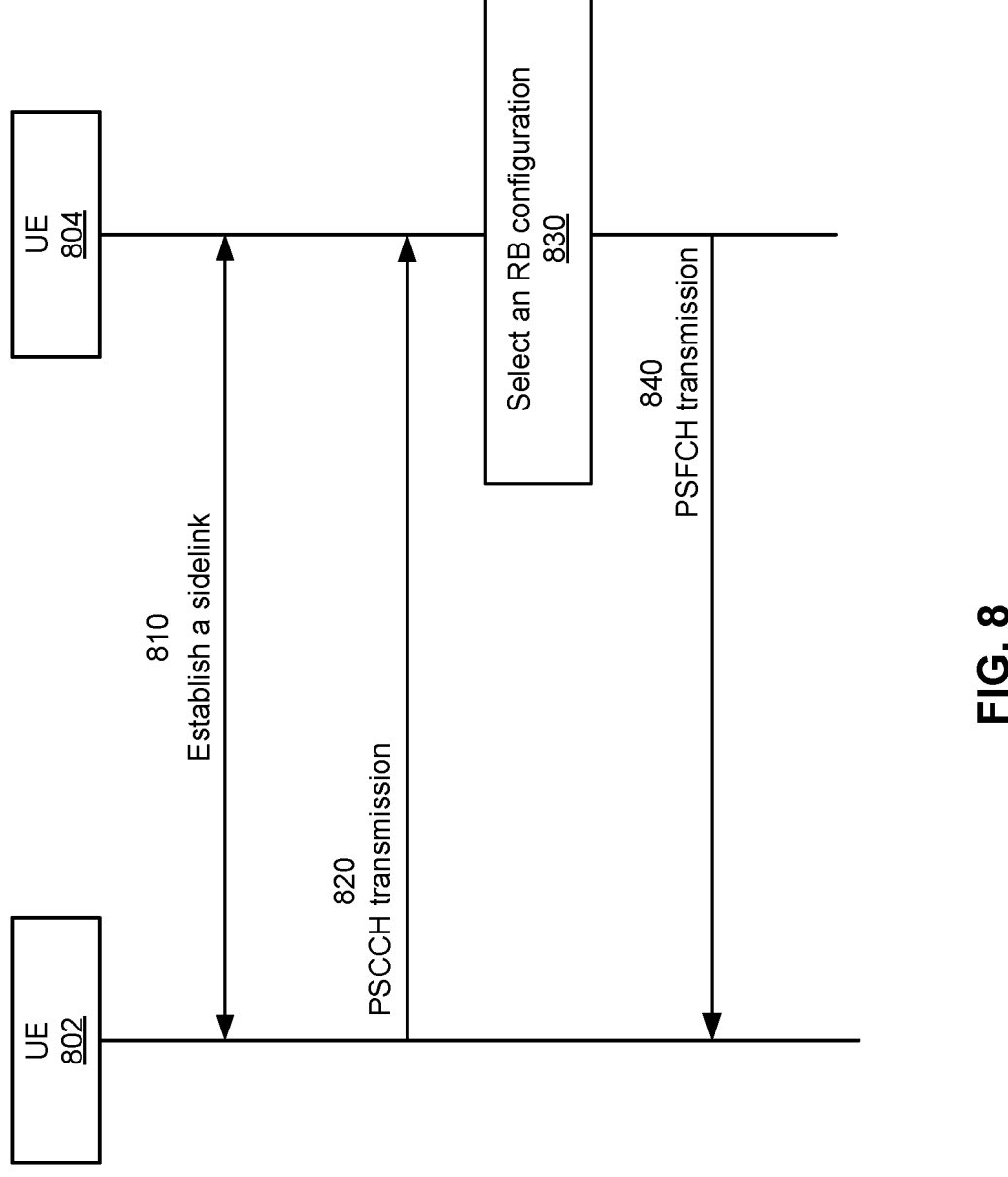
FIG. 8 is a diagram illustrating an example of a wireless communication process between a first UE and a second UE, in accordance with the present disclosure.

FIG. 8 is a diagram illustrating an example 800 of a wireless communication process between a first UE 802 (e.g., a UE 120) and a second UE (e.g., another UE 120), in accordance with the present disclosure.

As shown by reference number 810, a first UE 802 and a second UE 804 may establish a sidelink. In some aspects, the first UE 802 and the second UE 804 may establish the sidelink based at least in part on using unlicensed spectrum. Based at least in part on establishing the sidelink, the first UE 802 may transmit information to the second UE 804, and/or the second UE 804 may transmit information to the first UE 802. To illustrate, the first UE 802 may indicate UE capability information to the second UE 804, and/or the second UE 804 may indicate UE capability information to the first UE 802. Alternatively, or additionally, the first UE 802 may indicate configuration information to the second UE 804. As one example, the first UE 802 may indicate one or more parameters (e.g., RRC configured parameters) to the second UE 804 that are associated with a PSFCH transmission, such as a resource pool, a resource pool size, and/or a configuration of the resource pool associated with the PSFCH transmission. As another example, the first UE 802 may indicate any combination of a PSFCH capacity demand, a groupcast size, a maximum number of available RBs that are dedicated to the PSFCH in one full interlaced PSFCH waveform with a common interlace, and/or a number of contiguous PRBs for respective ACK/NACK feedback indications (e.g., K3).

As shown by reference number 820, the first UE 802 may transmit, and the second UE 804 may receive, a PSCCH transmission. In some aspects, the PSCCH transmission may use and/or may be based at least in part on unlicensed spectrum. In some aspects, the first UE 802 may transmit the PSCCH transmission as a unicast transmission that is directed to the second UE 804. In other aspects, the first UE 802 may transmit the PSCCH transmission as a groupcast and/or multicast transmission that is directed to multiple UEs.

As shown by reference number 830, the second UE 804 may select an RB configuration for a PSFCH transmission that is associated with the PSCCH transmission. To illustrate, the second UE 804 may select an RB configuration one or more RBs that are associated with a PSFCH transmission (e.g., an ACK/NACK feedback indication associated with the PSCCH transmission described with regard to reference number 820). In some aspects, the second UE 804 may select the RB configuration being associated with the unlicensed spectrum (e.g., based at least in part on the RB(s) being located in the unlicensed spectrum).

As one RB configuration, the second UE 804 may select an RB configuration that is based at least in part on a selection rule that indicates to select each RB of the RB(s) in a same interlace. To illustrate, the second UE 804 may select an RB configuration that is based at least in part on each RB being in a contiguous interlace (an interlace in which the PRBs are contiguous in frequency and/or time) and/or each RB being in a distributed interlace (e.g., an interlace in which at least some of the PRBs are non-contiguous in frequency and/or time). Accordingly, the second UE 804 may select an RB configuration that is based at least in part on each RB that is associated with the PSFCH transmission being in a same interlace.

In some aspects, the second UE 804 may select the RB configuration based at least in part on a selection rule that specifies to select RBs that are contiguous in frequency and are in a same time resource (e.g., a same time slot and/or a same symbol). In some aspects, the contiguous RBs may be located in different interlaces (e.g., a common interlace and a configured interlace). Accordingly, the second UE 804 may select an RB configuration that is associated with using a first RB that is located in a first interlace and a second RB that is contiguous with the first RB in at least frequency and is located in a second interlace.

The second UE 804 may select the RB configuration based at least in part on a selection rule that specifies to select RBs that are separated from one another based at least in part on a frequency span. That is, the second UE 804 may select an RB configuration that specifies each RB associated with the PSFCH transmission is separated from one another by a frequency span, such as a 1 MHz or greater frequency span. For example, each RB may be equally and/or evenly separated from the other RBs by a same frequency span. Separating the RBs by a frequency span may enable the second UE 804 to use a higher transmission power level for the PSFCH transmission (e.g., via the RBs) and satisfy a PSD condition.

Alternatively, or additionally, the second UE 804 may select the RB configuration based at least in part on a selection rule that specifies to select the RB configuration based at least in part on cast type associated with the PSCCH transmission. That is, the second UE 804 may select different RB configurations and/or a different number of RBs to use for a PSFCH transmission for different cast types. To illustrate, for a unicast type PSCCH transmission, the second UE 804 may select an RB configuration that specifies to use a maximum number of RBs that are dedicated to the PSFCH in one full interlaced PSFCH waveform that includes a common interlace, such as that described with regard to FIG. 6. That is, the second UE 804 may select the maximum number of RBs for a unicast type based at least in part on the capacity of the PSFCH being dedicate to a single UE. Selecting the maximum number of RBs allows the second UE 804 to transmit the PSFCH transmission (e.g., an ACK/NACK response) at a higher transmission power to mitigate low power transmissions and satisfy a PSD condition.

In some aspects, for a groupcast type, the second UE 804 may select the RB configuration based at least in part on the selection rule that specifies to select RBs that are contiguous in an interlace (e.g., a contiguous interlace and/or a distributed interlace). Based at least in part on the ACK/NACK response being a NACK response, the second UE 804 may select the maximum number of RBs that are dedicated to the PSFCH in one full interlaced PSFCH waveform with a common interlace. To illustrate, a NACK response may indicate a decoding error, and a UE may not transmit the NACK response if decoding by the UE is successful. Accordingly, for NACK response, the PSFCH capacity may be less strained relative to an ACK response and the second UE 804 may select a full interlace (e.g., the maximum number of RBs that are dedicated to the PSFCH in one full interlaced PSFCH waveform with a common interlace) for the NACK response. Alternatively, or additionally, for a groupcast type, the second UE 804 may select the RB configuration based at least in part on the selection rule that specifies to select RBs that are separated from one another based at least in part on a frequency span (e.g., each RB is separated from an adjacent RB by the frequency span).

In some aspects, for a groupcast type, the second UE 804 may select, as at least part of the RB configuration for an ACK/NACK feedback indication, a number of RBs that is less than the maximum number of RBs that are dedicated to the PSFCH in one full interlaced PSFCH waveform with a common interlace. As one example, the second UE 804 may select the number of RBs based at least in part on a group size and/or number of UEs associated with the groupcast that includes the second UE 804. For instance, the second UE 804 may select a number of RBs that is inversely proportional with the group size (e.g., as the group size increases, the number of RBs selected by the second UE 804 decreases). To illustrate, for a first group size, the second UE 804 may select a first number of RBs. For a second group size that is a smaller number that first group size, the second UE 804 may select a second number of RBs that is larger than the first number of RBs. For a third group size that is larger than the first group size, the second UE 804 may select a third number of RBs that is smaller than the first number. Accordingly, larger group sizes may utilize more PSFCH multiplexing capacity relative to smaller group sizes such that the second UE 804 selects a number of RBs that is inversely proportional to the group size. Alternatively, or additionally, for a groupcast type, the second UE 804 may select the number of RBs is based at least in part on a maximum allowed transmit power level and/or a PSD condition. The number of RBs selected by the second UE 804 may be bounded by a maximum number of RBs that are dedicated to the PSFCH in one full interlaced PSFCH waveform with a common interlace.

In some aspects, for a groupcast type, the second UE 804 may select, as the RB configuration, the number of RBs and/or a location of the RBs based at least in part on a resource pool and a PSFCH capacity demand. To illustrate, a maximum number of available RBs for a PSFCH transmission may vary based at least in part on a resource pool size (e.g., a first resource pool with more resources may have a higher maximum number relative to a second resource pool with fewer resources). Accordingly, the number of RBs selected by the second UE 804 may vary based at least in part on the resource pool size. Alternatively, or additionally, the number of RBs selected by the 804 may be based at least in part on a PSFCH capacity demand. As one example, the PSFCH capacity demand may be associated with the second UE 804 and/or a group size (e.g., a number of UEs multiplexing a respective ACK/NACK response). For instance, the second UE 804 may select the number of RBs based at least in part on a link at the second UE 804 that is associated with the PSFCH transmission (e.g., a per link basis) and/or session at the second UE 804 that is associated with the PSFCH transmission (e.g., a per session basis). Alternatively, or additionally, the second UE 804 may transmit multiple PSFCH, and each PSFCH may be associated with a respective link. In some aspects, the second UE 804 may select a respective number of RBs for each respective link independently (e.g., without information associated with the other links). Accordingly, the second UE 804 may select the number of RBs based at least in part on a transmission allocation associated with transmissions by the second UE 804 (e.g., based on the link and/or the session), a number of available resources, and/or a number of UEs multiplexing in the available resources.

In some aspects, the second UE 804 may receive an indication of the number of RBs to use from the first UE 802 as described above. That is, the number of RBs may be RRC configured. In some aspects, the second UE 804 may select fewer RBs to use for the PSFCH transmission than indicated by the first UE 802. For example, the second UE 804 may determine that one or more RBs may overlap with a separate PSFCH occasion (e.g., that is not associated with the PSFCH transmission by the second UE 804). Alternatively, or additionally, the second UE 804 select the overlapping RBs based at least in part on receiving information that indicates the first UE 802 is not monitoring for replicated PSFCH transmissions.

The second UE 804 may select the RB configuration based at least in part on a mapping for the RBs that is based at least in part on the PSCCH transmission and a basic frequency unit. In some aspects, the basic frequency unit may be based at least in part on one or more PRBs. For instance, a basic frequency unit may include three PRBs such that a mapping to a third basic frequency unit of the available resources of the PSFCH may be based at least in part on nine PRBs. As another example, a resource pool associated with the PSFCH may include a set of basic frequency units such that an allocation of one resource from the resource pool equates to an allocation of three PRBs.

In some aspects, various characteristics of the resource pool may be referenced using the basic frequency units. As one example, a resource pool may be characterized a set of basic frequency units, and characteristics of the resource pool may be referenced using the basic frequency unit, such as a single time slot of the resource pool being characterized by a set and/or subset of basic frequency units. Alternatively, or additionally, resources within the resource pool and/or mappings to resources within the resource pool may be characterized using the basic frequency unit. For instance, a mapping to the PSFCH interlace similar to that described with regard to reference number 706 (e.g., used by a UE 120) may be based at least in part on the basic frequency unit. To illustrate, a mapping may refer to a relationship between a start of the PSFCH and a leading interlace associated with the PSCCH transmission (e.g., in a same interlace) based at least in part on a basic frequency unit, such a time slot relationship that is based at least in part on a set of basic frequency units. In some aspects, the available PSFCH resources (e.g., basic frequency unit resources) may be evenly distributed and/or partitioned, and/or mapped to different PSSCH subchannels and/or slots based at least in part on the basic frequency units. Alternatively, or additionally, the PSFCH resources (e.g., basic frequency units) may be partitioned into partial PSFCH interlaces (e.g., a portion of a PSFCH interlace), and the partial PSFCH interlaces may be evenly distributed across PSSCH time slots and/or PSSCH subchannels. That is, a mapping used by a UE 120 may be based at least in part on each PSSCH time slot and/or PSSCH subchannel being mapped to a respective partial PSFCH interlace based at least in part on a time partition of the partial PSFCH interlace, followed by frequency partition associated with the partial PSFCH interlace. To illustrate, a first PSSCH resource in a first time slot of a PSSCH subchannel may be mapped to a first partial PSFCH interlace, and a second PSSCH resource in a second time slot of the same PSSCH subchannel may be mapped to a second partial PSFCH interlace. Accordingly different PSSCH slots may be mapped to different basic frequency units (e.g., a set of one or more PRBs) in a PSFCH interlace. In a similar manner as described with regard to FIG. 7, the second UE 804 may select, as at least part of the RB configuration, a CS pair from a CS pair set that is characterized based at least in part on the basic frequency unit using a hash function, such as $$(P_{ID} + M_{ID}) \bmod N_{PRB,CS}^{PSFCH}.$$

For a PSFCH interlace (e.g., the PSFCH interlace as described with regard to FIG. 7), the second UE 804 may select the RB configuration based at least in part on a one-to-one mapping that is associated with a relationship between a leading PSSCH interlace and a PSFCH interlace. As one example, and in a similar manner as described with regard to FIG. 7, different IRB slots (e.g., a set of IRBs) and/or different logical interlaces within the PSFCH interlace may be mapped to respective CS pair sets. The second UE 804 may select a particular set of IRBs (e.g., an IRB slot) based at least in part on the mapping and/or select a CS pair from the respective CS pair set associated with the set of IRBs based at least in part on a hash function, such as a hash function that is based at least in part on a source ID and a receiver ID as described above. Using a hash function that is based at least in part on the source ID and the receiver ID may mitigate at least some transmission collisions between multiple UEs based at least in the different receiver IDs resulting in a different CS pair selection from the CS pair set.

As shown by reference number 840, the second UE 804 may transmit, and the first UE 802 may receive, a PSFCH transmission. To illustrate, the second UE 804 may transmit an ACK/NACK response and/or an ACK/NACK feedback indication that is associated with the PSCCH transmission. In various aspects, the second UE 804 may transmit the PSFCH transmission based at least in part on using the PSFCH and the RB configuration for the RB(s).

A UE selecting an RB configuration for a PSFCH transmission based at least in part on one or more selection rules as described above may enable the UE to mitigate collisions between multiple UEs that may respond to a same PSCCH transmission. Alternatively, or additionally, the selection rule(s) may enable a UE, or multiple UEs, to satisfy a PSD condition and/or increase a transmission power of the PSFCH transmission. Mitigating collisions, satisfying a PSD condition, and/or increasing a transmission power may result in reduced air interface resource usage by the UE, reduced recovery errors, and/or reduced data transfer latencies in a wireless network.

As indicated above, FIG. 8 is provided as an example. Other examples may differ from what is described with regard to FIG. 8.

FIG. 9 is a diagram illustrating an example process 900 performed, for example, by a UE, in accordance with the present disclosure. Example process 900 is an example where the UE (e.g., UE 120) performs operations associated with configuring an ACK/NACK transmission using a PSFCH in unlicensed spectrum.

As shown in FIG. 9, in some aspects, process 900 may include receiving a PSCCH transmission that uses unlicensed spectrum (block 910). For example, the UE (e.g., using reception component 1002 and/or communication manager 1006, depicted in FIG. 10) may receive a PSCCH transmission that uses unlicensed spectrum, as described above.

As further shown in FIG. 9, in some aspects, process 900 may include selecting an RB configuration for one or more RBs that are associated with a PSFCH transmission, the RB configuration being based at least in part on the unlicensed spectrum (block 920). For example, the UE (e.g., using communication manager 1006, depicted in FIG. 10) may select an RB configuration for one or more RBs that are associated with a PSFCH transmission, the RB configuration being based at least in part on the unlicensed spectrum, as described above.

As further shown in FIG. 9, in some aspects, process 900 may include transmitting an ACK/NACK response to the PSCCH transmission based at least in part on using the PSFCH and the RB configuration for the one or more RBs (block 930). For example, the UE (e.g., using transmission component 1004 and/or communication manager 1006, depicted in FIG. 10) may transmit an ACK/NACK response to the PSCCH transmission based at least in part on using the PSFCH and the RB configuration for the one or more RBs, as described above.

Process 900 may include additional aspects, such as any single aspect or any combination of aspects described below and/or in connection with one or more other processes described elsewhere herein.

In a first aspect, the one or more RBs include at least two RBs, and the RB configuration for the one or more RBs includes each RB of the at least two RBs being in a same interlace.

In a second aspect, the same interlace includes at least one of a contiguous interlace, or a distributed interlace.

In a third aspect, the one or more RBs include at least two RBs, and the RB configuration includes the at least two RBs being contiguous in frequency and in a same time resource.

In a fourth aspect, a first RB of the at least two RBs is located in a first interlace, and a second RB of the at least two RBs is located in a second interlace.

In a fifth aspect, the one or more RBs include at least two RBs, and the RB configuration includes each RB of the at least two RBs being separated from an adjacent RB by a frequency span.

In a sixth aspect, the frequency span is greater than 1 megaHertz.

In a seventh aspect, the RB configuration is based at least in part on a cast type associated with the PSCCH transmission.

In an eighth aspect, the cast type includes a unicast type, the one or more RBs include at least two RBs, and the at least two RBs include a maximum number of RBs that are dedicated to the PSFCH in one full interlaced PSFCH waveform with a common interlace.

In a ninth aspect, the cast type includes a groupcast type, the RB configuration for the at least two RBs includes the at least two RBs being contiguous in an interlace, and the at least two RBs include a maximum number of RBs that are dedicated to the PSFCH in one full interlaced PSFCH waveform with a common interlace.

In a tenth aspect, the cast type includes a groupcast type, the RB configuration for the one or more RBs includes each RB being separated from an adjacent RB by a frequency span, and the one or more RBs include less than a maximum number of RBs that are dedicated to the PSFCH in one full interlaced PSFCH waveform with a common interlace.

In an eleventh aspect, the cast type includes a groupcast type, and a number of RBs included in the at least two RBs is based at least in part on a group size associated with a groupcast.

In a twelfth aspect, the number of RBs is inversely proportional with the group size, and the number of RBs is bounded by a maximum number of RBs that are dedicated to the PSFCH in one full interlaced PSFCH waveform with a common interlace.

In a thirteenth aspect, the number of RBs is based at least in part on a maximum allowed transmit power level.

In a fourteenth aspect, the RB configuration for the one or more RBs is RRC configured.

In a fifteenth aspect, the RB configuration for one or more RBs is based at least in part on a resource pool and a PSFCH capacity demand.

In a sixteenth aspect, the RB configuration for the one or more RBs is based at least in part on a per link basis and a PSFCH capacity demand.

In a seventeenth aspect, the RB configuration for the one or more RBs is based at least in part on a per session basis and a PSFCH capacity demand.

In an eighteenth aspect, the RB configuration is based at least in part on a mapping for the one or more RBs that is based at least in part on a PSSCH and a basic frequency unit, and the basic frequency unit includes one or more PRBs.

In a nineteenth aspect, the mapping is based at least in part on a set of basic frequency units in a resource pool being associated with a single slot.

In a twentieth aspect, the mapping is based at least in part on a start of the PSFCH being on a same interlace as a leading interlace associated with the PSSCH.

In a twenty-first aspect, the mapping is based at least in part on a hash function.

In a twenty-second aspect, the one or more RBs includes at least two RBs, the RB configuration each RB of the at least two RBs being in a same interlace, the RB configuration includes a mapping for the at least two RBs that is based at least in part on the PSCCH transmission, and the mapping includes a slot within a PSFCH interlace being mapped to at least one of a PSFCH CS pair set, or a set of IRBs.

In a twenty-third aspect, the mapping is based at least in part on a hashing function that is associated with at least one of a source ID, or a receiver ID.

In a twenty-fourth aspect, the one or more RBs are included in a PSFCH interlace, the PSFCH interlace includes multiple partial PSFCH interlaces, and the RB configuration is based at least in part on a mapping between a time slot associated with the PSSCH transmission, a subchannel associated with the PSSCH transmission, and a particular partial PSFCH interlace of the multiple partial PSFCH interlaces.

In a twenty-fifth aspect, the mapping is based at least in part on a time partition associated with the particular partial PSFCH interlace and a frequency partition associated with the partial PSFCH interlace.

In a twenty-sixth aspect, process 900 includes receiving an indication of a number of RBs to use for the PSFCH transmission, determining that at least one RB overlaps in frequency with another transmission, and selecting, for the one or more RBs associated with the RB configuration, fewer RBs than the number of RBs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
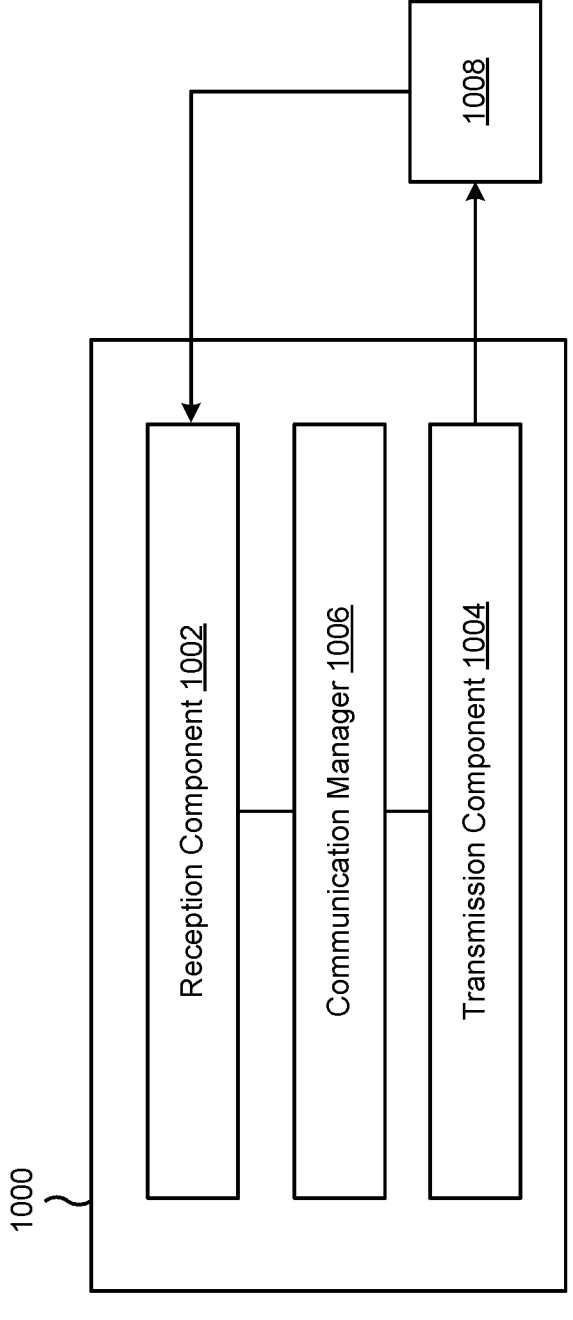
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 7-9. Additionally, or alternatively, the apparatus 1000 may be configured to perform one or more processes described herein, such as process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may receive, by way of the reception component 1002, a PSCCH transmission that uses unlicensed spectrum. The communication manager 1006 may select an RB configuration for one or more RBs that are associated with a PSFCH transmission, the RB configuration being based at least in part on the unlicensed spectrum. The communication manager 1006 may transmit, by way of the transmission component 1004, an ACK/NACK response to the PSCCH transmission based at least in part on using the PSFCH and the RB configuration for the one or more RBs.

In some aspects, the communication manager 1006 may receive, by way of the reception component 1002, an indication of a number of RBs to use for the PSFCH transmission. The communication manager 1006 may determine that at least one RB overlaps in frequency with another transmission. In some aspects, the communication manager 1006 may select, for the one or more RBs associated with the RB configuration, fewer RBs than the number of RBs.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a physical sidelink shared channel (PSCCH) transmission that uses unlicensed spectrum; selecting a resource block (RB) configuration for one or more resource blocks (RBs) that are associated with a physical sidelink feedback channel (PSFCH) transmission, the RB configuration being based at least in part on the unlicensed spectrum; and transmitting an acknowledgement (ACK)/negative acknowledgement (NACK) response to the PSCCH transmission based at least in part on using the PSFCH and the RB configuration for the one or more RBs.

Aspect 2: The method of Aspect 1, wherein the one or more RBs comprise at least two RBs, and wherein the RB configuration for the one or more RBs comprises each RB of the at least two RBs being in a same interlace.

Aspect 3: The method of Aspect 2, wherein the same interlace comprises at least one of: a contiguous interlace, or a distributed interlace.

Aspect 4: The method of any of Aspects 1-3, wherein the one or more RBs comprise at least two RBs, and wherein the RB configuration comprises the at least two RBs being contiguous in frequency and in a same time resource.

Aspect 5: The method of Aspect 4, wherein a first RB of the at least two RBs is located in a first interlace, and wherein a second RB of the at least two RBs is located in a second interlace.

Aspect 6: The method of any of Aspects 1-5, wherein the one or more RBs comprise at least two RBs, and wherein the RB configuration comprises each RB of the at least two RBs being separated from an adjacent RB by a frequency span.

Aspect 7: The method of Aspect 6, wherein the frequency span is greater than 1 megahertz.

Aspect 8: The method of any of Aspects 1-7, wherein the RB configuration is based at least in part on a cast type associated with the PSCCH transmission.

Aspect 9: The method of Aspect 8, wherein the cast type comprises a unicast type, wherein the one or more RBs comprise at least two RBs, and wherein the at least two RBs include a maximum number of RBs that are dedicated to the PSFCH in one full interlaced PSFCH waveform with a common interlace.

Aspect 10: The method of Aspect 8, wherein the cast type comprises a groupcast type, wherein the one or more RBs comprise at least two RBs, and wherein the RB configuration for the at least two RBs comprises the at least two RBs being contiguous in an interlace, and wherein the at least two RBs include a maximum number of RBs that are dedicated to the PSFCH in one full interlaced PSFCH waveform with a common interlace.

Aspect 11: The method of Aspect 8, wherein the cast type comprises a groupcast type, wherein the RB configuration for the one or more RBs comprises each RB being separated from an adjacent RB by a frequency span., and wherein the one or more RBs include less than a maximum number of RBs that are dedicated to the PSFCH in one full interlaced PSFCH waveform with a common interlace.

Aspect 12: The method of Aspect 8, wherein the cast type comprises a groupcast type, wherein the one or more RBs comprise at least two RBs, and wherein a number of RBs included in the at least two RBs is based at least in part on a group size associated with a groupcast.

Aspect 13: The method of Aspect 12, wherein the number of RBs is inversely proportional with the group size, and wherein the number of RBs is bounded by a maximum number of RBs that are dedicated to the PSFCH in one full interlaced PSFCH waveform with a common interlace.

Aspect 14: The method of Aspect 12, wherein the number of RBs is based at least in part on a maximum allowed transmit power level.

Aspect 15: The method of any of Aspects 1-14, wherein the RB configuration for the one or more RBs is radio resource control (RRC) configured.

Aspect 16: The method of Aspect 15, wherein the RB configuration for one or more RBs is based at least in part on a resource pool and a PSFCH capacity demand.

Aspect 17: The method of Aspect 15, wherein the RB configuration for the one or more RBs is based at least in part on a per link basis and a PSFCH capacity demand.

Aspect 18: The method of Aspect 15, wherein the RB configuration for the one or more RBs is based at least in part on a per session basis and a PSFCH capacity demand.

Aspect 19: The method of any of Aspects 1-18, wherein the RB configuration is based at least in part on a mapping for the one or more RBs that is based at least in part on a physical sidelink shared channel (PSSCH) and a basic frequency unit, and wherein the basic frequency unit comprises one or more physical resource blocks (PRBs).

Aspect 20: The method of Aspect 19, wherein the mapping is based at least in part on a set of basic frequency units in a resource pool being associated with a single slot.

Aspect 21: The method of Aspect 19, wherein the mapping is based at least in part on a start of the PSFCH being on a same interlace as a leading interlace associated with the PSSCH.

Aspect 22: The method of Aspect 19, wherein the mapping is based at least in part on a hash function.

Aspect 23: The method of any of Aspects 1-22, wherein the one or more RBs comprises at least two RBs, wherein the RB configuration each RB of the at least two RBs being in a same interlace, wherein the RB configuration comprises a mapping for the at least two RBs that is based at least in part on the PSCCH transmission, and wherein the mapping comprises a slot within a PSFCH interlace being mapped to at least one of: a PSFCH cyclic shift (CS) pair set, or a set of interlaced resource blocks (IRBs).

Aspect 24: The method of Aspect 23, wherein the mapping is based at least in part on a hashing function that is associated with at least one of: a source identifier (ID), or a receiver ID.

Aspect 25: The method of any of Aspects 1-24, wherein the one or more RBs are included in a PSFCH interlace, wherein the PSFCH interlace comprises multiple partial PSFCH interlaces, and wherein the RB configuration is based at least in part on a mapping between a time slot associated with a physical sidelink shared channel (PSSCH) transmission, a subchannel associated with the PSSCH transmission, and a particular partial PSFCH interlace of the multiple partial PSFCH interlaces.

Aspect 26: The method of Aspect 25, wherein the mapping is based at least in part on a time partition associated with the particular partial PSFCH interlace and a frequency partition associated with the partial PSFCH interlace.

Aspect 27: The method of any of Aspects 1-26, further comprising: receiving an indication of a number of RBs to use for the PSFCH transmission; determining that at least one RB overlaps in frequency with another transmission; and selecting, for the one or more RBs associated with the RB configuration, fewer RBs than the number of RBs.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to cause the UE to:
receive a physical sidelink control channel (PSCCH) transmission that uses unlicensed spectrum;
select a resource block (RB) configuration for one or more resource blocks (RBs) that are associated with a physical sidelink feedback channel (PSFCH) transmission, the RB configuration being based at least in part on the unlicensed spectrum, wherein the RB configuration for one or more RBs is based at least in part on a resource pool and a PSFCH capacity demand; and
transmit an acknowledgement (ACK)/negative acknowledgement (NACK) response to the PSCCH transmission based at least in part on using the PSFCH and the RB configuration for the one or more RBs.

2. The apparatus of claim 1, wherein the one or more RBs comprise at least two RBs, and
wherein the RB configuration for the one or more RBs comprises each RB of the at least two RBs being in a same interlace.

3. The apparatus of claim 2, wherein the same interlace comprises at least one of:
a contiguous interlace, or
a distributed interlace.

4. The apparatus of claim 1, wherein the RB configuration is based at least in part on a cast type associated with the PSCCH transmission.

5. The apparatus of claim 1, wherein the RB configuration for the one or more RBs is radio resource control (RRC) configured.

6. The apparatus of claim 5, wherein the RB configuration for the one or more RBs is based at least in part on a per link basis.

7. The apparatus of claim 5, wherein the RB configuration for the one or more RBs is based at least in part on a per session basis.

8. The apparatus of claim 1, wherein the one or more RBs comprises at least two RBs,
wherein the RB configuration comprises each RB of the at least two RBs being in a same interlace,
wherein the RB configuration comprises a mapping for the at least two RBs that is based at least in part on the PSCCH transmission, and
wherein the mapping comprises a slot within a PSFCH interlace being mapped to at least one of:
a PSFCH cyclic shift (CS) pair set, or
a set of interlaced resource blocks (IRBs).

9. The apparatus of claim 8, wherein the mapping is based at least in part on a hashing function that is associated with at least one of:
a source identifier (ID), or
a receiver ID.

10. The apparatus of claim 1, wherein the one or more processors are further configured to cause the UE to:
receive an indication of a number of RBs to use for the PSFCH transmission;
determine that at least one RB overlaps in frequency with another transmission; and
select, for the one or more RBs associated with the RB configuration, fewer RBs than the number of RBs.

11. A method of wireless communication performed by a user equipment (UE), comprising:
receiving a physical sidelink control channel (PSCCH) transmission that uses unlicensed spectrum;
selecting a resource block (RB) configuration for one or more resource blocks (RBs) that are associated with a physical sidelink feedback channel (PSFCH) transmission, the RB configuration being based at least in part on the unlicensed spectrum, wherein the RB configuration for one or more RBs is based at least in part on a resource pool and a PSFCH capacity demand; and
transmitting an acknowledgement (ACK)/negative acknowledgement (NACK) response to the PSCCH transmission based at least in part on using the PSFCH and the RB configuration for the one or more RBs.

12. The method of claim 11, wherein the one or more RBs comprise at least two RBs, and
wherein the RB configuration for the one or more RBs comprises each RB of the at least two RBs being in a same interlace.

13. The method of claim 12, wherein the same interlace comprises at least one of:
a contiguous interlace, or
a distributed interlace.

14. The method of claim 11, wherein the RB configuration for the one or more RBs is radio resource control (RRC) configured.

15. The method of claim 11, wherein the one or more RBs comprises at least two RBs,
wherein the RB configuration comprises each RB of the at least two RBs being in a same interlace,
wherein the RB configuration comprises a mapping for the at least two RBs that is based at least in part on the PSCCH transmission, and
wherein the mapping comprises a slot within a PSFCH interlace being mapped to at least one of:
a PSFCH cyclic shift (CS) pair set, or
a set of interlaced resource blocks (IRBs).

16. The method of claim 15, wherein the mapping is based at least in part on a hashing function that is associated with at least one of:
a source identifier (ID), or
a receiver ID.

17. The method of claim 11, further comprising:
receiving an indication of a number of RBs to use for the PSFCH transmission;
determining that at least one RB overlaps in frequency with another transmission; and
selecting, for the one or more RBs associated with the RB configuration, fewer RBs than the number of RBs.

18. A non-transitory computer-readable medium storing a set of instructions for wireless communication, the set of instructions comprising:
one or more instructions that, when executed by one or more processors of a user equipment (UE), cause the UE to:
receive a physical sidelink control channel (PSCCH) transmission that uses unlicensed spectrum;
select a resource block (RB) configuration for one or more resource blocks (RBs) that are associated with a physical sidelink feedback channel (PSFCH) transmission, the RB configuration being based at least in part on the unlicensed spectrum, wherein the RB configuration for one or more RBs is based at least in part on a resource pool and a PSFCH capacity demand; and
transmit an acknowledgement (ACK)/negative acknowledgement (NACK) response to the PSCCH transmission based at least in part on using the PSFCH and the RB configuration for the one or more RBs.

19. The non-transitory computer-readable medium of claim 18, wherein the one or more RBs comprise at least two RBs, and
wherein the RB configuration for the one or more RBs comprises each RB of the at least two RBs being in a same interlace.

20. The non-transitory computer-readable medium of claim 18, wherein the RB configuration for the one or more RBs is radio resource control (RRC) configured.

21. The non-transitory computer-readable medium of claim 18, wherein the one or more RBs comprises at least two RBs,
wherein the RB configuration comprises each RB of the at least two RBs being in a same interlace,
wherein the RB configuration comprises a mapping for the at least two RBs that is based at least in part on the PSCCH transmission, and
wherein the mapping comprises a slot within a PSFCH interlace being mapped to at least one of:
a PSFCH cyclic shift (CS) pair set, or
a set of interlaced resource blocks (IRBs).

22. The non-transitory computer-readable medium of claim 21, wherein the mapping is based at least in part on a hashing function that is associated with at least one of:
a source identifier (ID), or
a receiver ID.

23. The non-transitory computer-readable medium of claim 18, the set of instructions further causing the UE to:

receive an indication of a number of RBs to use for the PSFCH transmission;
determine that at least one RB overlaps in frequency with another transmission; and
select, for the one or more RBs associated with the RB configuration, fewer RBs than the number of RBs.

24. An apparatus for wireless communication, comprising:
means for receiving a physical sidelink control channel (PSCCH) transmission that uses unlicensed spectrum;
means for selecting a resource block (RB) configuration for one or more resource blocks (RBs) that are associated with a physical sidelink feedback channel (PSFCH) transmission, the RB configuration being based at least in part on the unlicensed spectrum, wherein the RB configuration for one or more RBs is based at least in part on a resource pool and a PSFCH capacity demand; and
means for transmitting an acknowledgement (ACK)/negative acknowledgement (NACK) response to the PSCCH transmission based at least in part on using the PSFCH and the RB configuration for the one or more RBs.

25. The apparatus of claim 24, wherein the one or more RBs comprise at least two RBs, and
wherein the RB configuration for the one or more RBs comprises each RB of the at least two RBs being in a same interlace.

26. The apparatus of claim 24, wherein the RB configuration for the one or more RBs is radio resource control (RRC) configured.

27. The apparatus of claim 24, wherein the one or more RBs comprises at least two RBs,
wherein the RB configuration comprises each RB of the at least two RBs being in a same interlace,
wherein the RB configuration comprises a mapping for the at least two RBs that is based at least in part on the PSCCH transmission, and
wherein the mapping comprises a slot within a PSFCH interlace being mapped to at least one of:
a PSFCH cyclic shift (CS) pair set, or
a set of interlaced resource blocks (IRBs).

28. The apparatus of claim 27, wherein the mapping is based at least in part on a hashing function that is associated with at least one of:
a source identifier (ID), or
a receiver ID.

29. The apparatus of claim 24, further comprising:
means for receiving an indication of a number of RBs to use for the PSFCH transmission;
means for determining that at least one RB overlaps in frequency with another transmission; and
means for selecting, for the one or more RBs associated with the RB configuration, fewer RBs than the number of RBs.

30. The apparatus of claim 24, wherein the RB configuration is based at least in part on a cast type associated with the PSCCH transmission.

* * * * *